US009730108B2

(12) United States Patent
Villasenor

(10) Patent No.: US 9,730,108 B2
(45) Date of Patent: Aug. 8, 2017

(54) NETWORK ARCHITECTURE USING WI-FI DEVICES

(71) Applicant: Plantronics, Inc., Santa Cruz, CA (US)

(72) Inventor: Luis Villasenor, Tijuana (MX)

(73) Assignee: Plantronics, Inc., Santa Cruz, CA (US)

( * ) Notice: Subject to any disclaimer, the term of this patent is extended or adjusted under 35 U.S.C. 154(b) by 734 days.

(21) Appl. No.: 13/715,736

(22) Filed: Dec. 14, 2012

(65) Prior Publication Data

US 2014/0169212 A1    Jun. 19, 2014

(51) Int. Cl.
*H04W 28/18* (2009.01)
*H04W 24/02* (2009.01)
*H04W 16/02* (2009.01)

(52) U.S. Cl.
CPC ........... *H04W 28/18* (2013.01); *H04W 24/02* (2013.01); *H04W 16/02* (2013.01)

(58) Field of Classification Search
CPC ..... H04W 72/04; H04W 28/18; H04W 24/02; H04W 16/02
USPC .................. 370/252; 455/33.1, 522; 343/846
See application file for complete search history.

(56) References Cited

U.S. PATENT DOCUMENTS

| 5,613,200 | A * | 3/1997 | Hamabe ..................... 455/450 |
| 6,035,208 | A * | 3/2000 | Osawa ....................... 455/522 |
| 6,795,688 | B1 | 9/2004 | Plasson et al. |
| 7,231,209 | B2 | 6/2007 | Blom et al. |
| 7,522,929 | B2 | 4/2009 | Hashizume |
| 7,580,393 | B2 | 8/2009 | Wang et al. |
| 7,720,021 | B1 | 5/2010 | Zhou et al. |
| 7,782,269 | B2 * | 8/2010 | Soler Castany et al. ..... 343/846 |
| 7,933,293 | B2 | 4/2011 | Wentink |
| 7,948,951 | B2 | 5/2011 | Wentink |
| 8,102,901 | B2 | 1/2012 | Aissi et al. |
| 8,144,596 | B2 | 3/2012 | Veillette |
| 2002/0163895 | A1 | 11/2002 | Haller et al. |
| 2004/0057440 | A1 | 3/2004 | Thubert et al. |
| 2004/0093426 | A1 | 5/2004 | Sahasrabudhe et al. |
| 2004/0162871 | A1 | 8/2004 | Pabla |
| 2004/0236850 | A1 | 11/2004 | Krumm |
| 2005/0058144 | A1 | 3/2005 | Ayyagari et al. |

(Continued)

FOREIGN PATENT DOCUMENTS

| EP | 1672899 A1 | 6/2006 |
| EP | 1865687 A1 | 12/2007 |

(Continued)

OTHER PUBLICATIONS

Campos, "Dynamic and Automatic Connection of Personal Area Networks to the Global Internet," Proceedings of the 2006 International Conference on Wireless Communications and Mobile Computing, Jul. 3-6, 2006, pp. 581-586, ACM, Vancouver Canada.

(Continued)

*Primary Examiner* — Gbemileke J Onamuti
(74) *Attorney, Agent, or Firm* — Chuang Intellectual Property Law

(57) ABSTRACT

Methods and apparatuses for Wi-Fi network operation are disclosed. In one example, a plurality of Wi-Fi bases are discovered, each Wi-Fi base associated with a wireless Wi-Fi device. A Wi-Fi channel associated with a group of Wi-Fi bases is selected and its use evaluated. An operational parameter is configured responsive to the Wi-Fi channel utilization.

19 Claims, 12 Drawing Sheets

(56) References Cited

U.S. PATENT DOCUMENTS

| | | |
|---|---|---|
| 2006/0023676 A1 | 2/2006 | Whitmore et al. |
| 2006/0133414 A1 | 6/2006 | Luoma et al. |
| 2006/0268896 A1 | 11/2006 | Kotola |
| 2007/0195760 A1 | 8/2007 | Rahman et al. |
| 2009/0017851 A1 | 1/2009 | Li et al. |
| 2009/0323647 A1 | 12/2009 | Park et al. |
| 2009/0325601 A1 | 12/2009 | Park et al. |
| 2011/0188391 A1* | 8/2011 | Sella et al. .................... 370/252 |
| 2011/0269502 A1 | 11/2011 | Clark et al. |
| 2011/0287795 A1 | 11/2011 | Cahill |
| 2011/0306367 A1 | 12/2011 | Cahill |
| 2012/0034937 A1 | 2/2012 | Cahill et al. |

FOREIGN PATENT DOCUMENTS

| | | |
|---|---|---|
| WO | WO 2007/085592 A1 | 8/2007 |
| WO | WO 2008/024099 A2 | 2/2008 |

OTHER PUBLICATIONS

Campos, "Autoconfiguration and Self-Management of Personal Area Network: A New Framework," 15th Meeting of the Wireless World Research Forum, Dec. 8-9, 2005, Paris, France.

Matsushita et al., "Wearable Key: Device for Personalizing Nearby Environment," Proceedings of the $4^{th}$ IEEE International Symposium on Wearable Computers, 2000, pp. 119, IEEE Computer Society, Washington, D.C., USA.

\* cited by examiner

NETWORK ARCHITECTURE USING WI-FI DEVICES

BACKGROUND OF THE INVENTION

Wi-Fi wireless networks are widely used for communications in wireless area local networks (WLANs). However, the number of wireless devices desired to be operated by users in both consumer and enterprise environments continue to grow. In order to accommodate an increasing number and variety of Wi-Fi devices, there is a need for efficient and effective configuration and operation of Wi-Fi networks.

As a result, improved methods and apparatuses for Wi-Fi network architectures are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
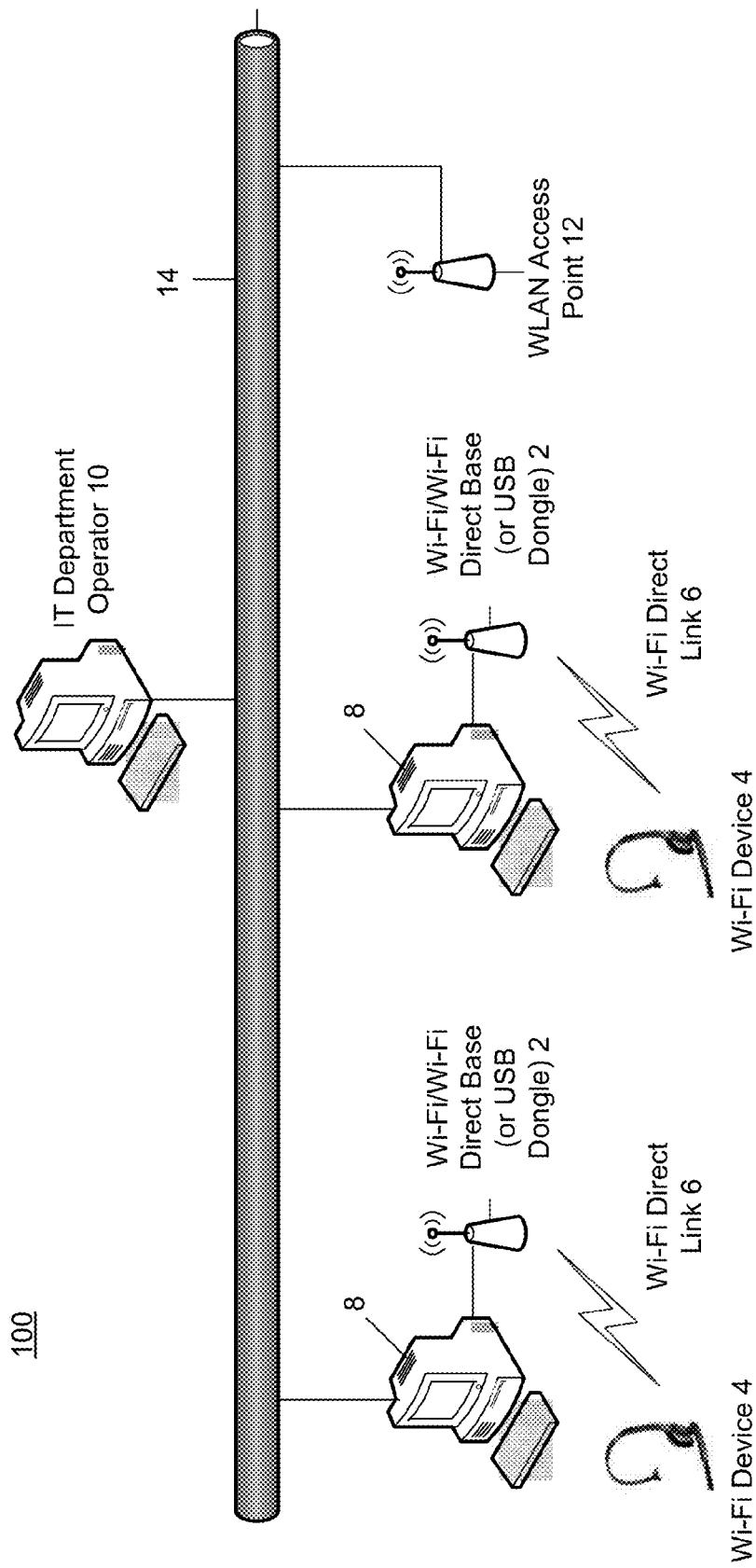
FIG. 1 illustrates a system for a Wi-Fi network in one example.

Methods and apparatuses for Wi-Fi networks are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example, a system includes a plurality of Wi-Fi bases and a plurality of wireless Wi-Fi devices. Each wireless Wi-Fi device is associated with a Wi-Fi base in a one-to-one relationship. The system further includes a computing device operable to transmit a control message to the plurality of Wi-Fi bases.

In one example, a method for operating a network of Wi-Fi bases includes discovering a plurality of Wi-Fi bases, each Wi-Fi base associated with a wireless Wi-Fi device in a one-to-one relationship. The method includes assigning each Wi-Fi base to a group of Wi-Fi bases, the plurality of Wi-Fi bases divided into two or more groups. An operating Wi-Fi channel is selected for each group of the two or more groups. The method further includes evaluating a Wi-Fi channel utilization at a Wi-Fi base, and configuring an operational parameter at the Wi-Fi base responsive to the Wi-Fi channel utilization.

In one example, a non-transitory computer readable storage memory stores instructions that when executed by a computer cause the computer to perform a method for Wi-Fi base operation. The method includes discovering a plurality of Wi-Fi bases, each Wi-Fi base associated with a wireless Wi-Fi device in a one-to-one relationship. The method includes selecting a Wi-Fi channel associated with a group of Wi-Fi bases, wherein the group of Wi-Fi bases is a subset of the plurality of Wi-Fi bases. The method further includes evaluating the Wi-Fi channel utilization, and configuring an operational parameter responsive to the Wi-Fi channel utilization.

Various examples described herein are related to the network architecture and networking devices, as well as applications, deployed to provide enhanced functionalities for audio/voice applications using Wi-Fi devices such as Wi-Fi headsets. In one example, a cognitive network architecture for audio/voice communications using Wi-Fi/Wi-Fi Direct devices involves a scenario where a large number of Wi-Fi bases (WFB) are paired with their Wi-Fi headset (WFH) and audio/voice traffic is exchanged between these two devices. For example, this type of scenario may be found in business environments and call centers, where a large number of users are expected to use the WFBs and WFHs. Furthermore, Wi-Fi technology is also employed by a broad number of devices, thus channel utilization increases with the number of devices operating in any given Wi-Fi channel. As a result, careful networking and application parameters are fine-tuned to provide the best possible operation performance for audio and voice applications. The term Wi-Fi as used herein refers generally to any wireless local area network products that are based on the Institute of Electrical and Electronics Engineers (IEEE) 802.11 standards, including the 802.11a, 802.11b, 802.11g, and/or 802.11n wireless networking standards.

In the architecture, WFBs can collaborate between themselves and gain knowledge about the wireless networking environment. This information is then used to optimize the operating parameters in the WFBs and WFHs. This knowledge of the networking environment results in a cognitive network architecture, where a cognitive process is used to perceive the current network conditions, and based on these conditions plan, decide and act with the purpose of achieving a specific goal. The architecture improves audio/voice transmission quality to provide the best possible operational performance under varying wireless networking conditions using Wi-Fi technology.

In one example, Wi-Fi Direct (WFD) is utilized. Wi-Fi Direct is a standard that allows Wi-Fi devices to connect to each other with greatly reduced setup. Wi-Fi Direct embeds a software access point (Soft AP) into any device supporting Wi-Fi Direct. The "Wi-Fi Peer-to-Peer (P2P) Technical Specification", Version 1.1, as published by the Wi-Fi Alliance, defines a procedure to greatly simplify the connectivity between devices using a peer-to-peer link approach, and is hereby incorporated by reference. As a result Wi-Fi Direct devices can now discover other WFD devices and launch a connection procedure, similar to the Bluetooth pairing process. A Wi-Fi chipset providing a high level of integration may be used, providing a standalone solution that does not require an external microcontroller (MCU). The chipset also provides audio capabilities, so a speaker and a microphone can be directly connected to the device. The use of devices based on Wi-Fi technology opens the possibility of interoperability with already deployed Wi-Fi networks and Wi-Fi devices in consumer and enterprise environments. For example, a Wi-Fi headset is capable of receiving an audio stream (via a wireless access point) from an Internet-based audio content server without the need of any other intermediate devices, such as a PC, tablet or smartphone. Other possibilities may include roaming support in the Wi-Fi headset by relaying audio/voice streams over the WLAN infrastructure, thus extending the service coverage within a building.

In one example, a cognitive network architecture for audio/voice communications using Wi-Fi/Wi-Fi Direct is implemented. The architecture makes use of (1) Wi-Fi bases with enhanced firmware functionalities, (2) Wi-Fi headsets with enhanced firmware functionalities, and (3) Software applications, and agents, to support troubleshooting and configuration functionalities.

The architecture provides a solution for the following issues: (1) Auto-configuration and Self-healing: A Wi-Fi headset (or the Wi-Fi base) can collaborate with other Wi-Fi headsets (or Wi-Fi bases) in the network. For example, a Wi-Fi headset (or the Wi-Fi base) can monitor the WLAN and discover other devices; as a result Wi-Fi bases can configure different operating channels to reduce interference with neighboring Wi-Fi headsets and Wi-Fi bases, (2) Remote Troubleshooting: a Wi-Fi headset (or the Wi-Fi base) can be remotely accessed by personnel from the IT department to troubleshoot the unit. For example, the Wi-Fi headset (or the Wi-Fi base) can report operational status information, such as, packet error rate, packet retransmission, delays, congestion and other metrics of interest, and (3) Remote Configuration: a Wi-Fi headset (or the Wi-Fi base) can be remotely accessed by personnel from the IT department to configure the unit. For example, the remote user may access the unit to set configuration parameters such as operating channel, data rates, enable/disable the RTS/CTS mechanism, enable/disable the use of wireless multimedia (WMM), enable/disable the use of power save (PS), change the operating frequency band, and other parameters of interest.

FIG. 1 illustrates a system 100 for a Wi-Fi network architecture in one example. System 100 includes a plurality of Wi-Fi bases 2 and a plurality of wireless Wi-Fi devices 4. Each wireless Wi-Fi device 4 is associated with a Wi-Fi base 2 in a one-to-one relationship. Each Wi-Fi base 2 is associated with a computing device 8 in a one-to-one relationship. In one example, a Wi-Fi base 2 is a USB device coupled to a USB port of the computing device 8. In a further example, the Wi-Fi base 2 and computing device 8 may be integrated into a single computing device, such as a desktop or laptop computer. In one example, the wireless Wi-Fi device 4 is a telecommunications headset as illustrated in FIG. 1. In one example, both Wi-Fi base 2 and Wi-Fi device 4 support the Wi-Fi Direct specification from the Wi-Fi Alliance, and thus may utilize a peer-to-peer Wi-Fi direct wireless link 6.

In this example, the system 100 further includes a computing device 10 operable to transmit a control message to the plurality of Wi-Fi bases 2. A WLAN access point 12 is operable to transmit a multicast message to the plurality of Wi-Fi bases 2. In one example, the control message is a remote configuration message or a remote troubleshooting message. In further example, there may be any number of Wi-Fi bases 2, Wi-Fi devices 4, WLAN access points 12, and computing devices 8, and computing devices 10.

The remote configuration message is operable to configure or modify an operational parameter at a Wi-Fi base 2. For example, the operational parameter configured may be a physical layer transmission power level, a physical layer transmission data rate, a MAC layer QoS parameter, an application layer packet payload size and packet transmission interval, or an application layer audio coding mechanism. In one example, responsive to receiving the remote troubleshooting message a Wi-Fi base 2 is configured to gather performance metrics including a packet loss rate, a packet retransmission rate, a packet delay, or a packet jitter.

In one example, each Wi-Fi base 2 is assigned to a group of Wi-Fi bases, where each group of Wi-Fi bases utilizes a different operating channel. Each Wi-Fi base 2 is operable to modify an operational parameter responsive to determining a low audio quality between the Wi-Fi base and the wireless Wi-Fi device 4, the operational parameter modified to improve the low audio quality.

In operation, the Wi-Fi device 4 and Wi-Fi base 2 implement firmware functionalities to support a bi-directional audio/voice stream between the Wi-Fi device 4 and the Wi-Fi base 2. The Wi-Fi device 4 and the Wi-Fi base 2 implement firmware functionalities to support device auto-configuration and self-healing functions. The Wi-Fi device 4 and the Wi-Fi base 2 execute additional functionalities such as:

(3) Scanning and monitoring activity in all the Wi-Fi channels in the supported frequency bands, which depending on the physical layer capabilities it may be 2.4 GHz, 5 GHz, or both frequency bands.

(4) Analytic or heuristic processing of the collected data (i.e. during the scanning/monitoring mode) to determine operational configuration parameters, including: (a) physical layer operational Wi-Fi channel, (b) physical layer transmission power level, (c) physical layer transmission data rate, (d) MAC layer QoS support, (e) routing layer roaming support, (f) Application layer packet payload size and packet transmission interval, (g) Application layer audio coding mechanism, and (h) control signaling to exchange configuration and self-healing messages between Wi-Fi devices 4 and Wi-Fi bases 2.

In one example, a Wi-Fi base 2 discovers the other Wi-Fi bases in the network. The Wi-Fi base 2 selects a Wi-Fi channel associated with a group of Wi-Fi bases, where the group of Wi-Fi bases is a subset of the plurality of Wi-Fi bases. The Wi-Fi base 2 evaluates the channel utilization of the selected Wi-Fi channel, and configures an operational parameter responsive to the Wi-Fi channel utilization. The operational parameter may include a physical layer transmission power level, a physical layer transmission data rate, a MAC layer QoS parameter, an application layer packet payload size and packet transmission interval, or an application layer audio coding mechanism. The Wi-Fi base 2 connects to the associated wireless Wi-Fi device 4.

In one example, evaluating a Wi-Fi channel utilization includes determining a high channel utilization condition or a low channel utilization condition. The Wi-Fi base 2 may receive a control message including a start voice session message, a remote configuration message, or a remote troubleshooting message. The Wi-Fi base 2 is operable to gather performance metrics responsive to the remote troubleshooting message. For example, the performance metrics may include a packet loss rate, a packet retransmission rate, a packet delay, or a packet jitter. The Wi-Fi base 2 is operable to modify an operational parameter responsive to determining a low audio quality with a wireless Wi-Fi device, the operational parameter modified to improve the low audio quality.

In one example, the Wi-Fi base 2 is a USB audio device at computing device 8. In one example implementation, Internet Protocol (IP) packets are sent between the Wi-Fi base 2 and the Wi-Fi device 4. These packets encapsulate the audio data required for playback/recording at the Wi-Fi device 4. For example, raw PCM audio packets are streamed using the RTP (Real-Time Protocol) protocol stack, where the RTP packets are sent using UDP over IP.

Figure 2:
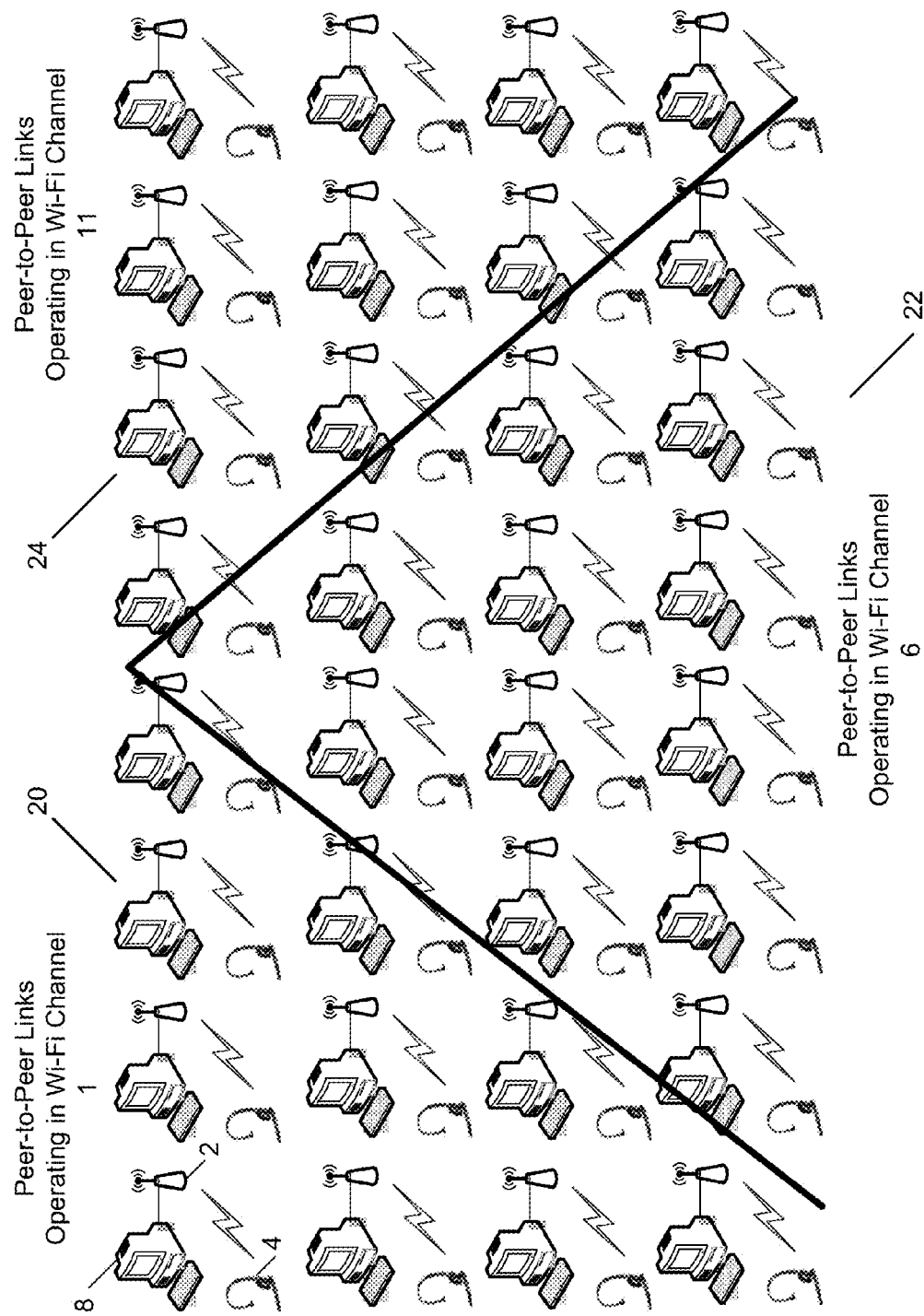
FIG. 2 illustrates adaptive channel auto-configuration of the system shown in FIG. 1.

In one example, each Wi-Fi base 2 of the plurality of Wi-Fi bases is assigned to a group of Wi-Fi bases, where each group of Wi-Fi bases utilizes a different operating channel. In one implementation, the system 100 network topology is composed of only computing devices 8 with Wi-Fi bases 2 and Wi-Fi devices 4 operating in the 2.4 GHz band. FIG. 2 shows an example of such a topology. In this particular non-limiting example, the topology is composed of 32 computing devices 8, 32 Wi-Fi bases 2 and 32 Wi-Fi devices 4. Each Wi-Fi base 2 has a Wi-Fi Direct (i.e. peer-to-peer) link with a single Wi-Fi device 4. In this scenario, the Wi-Fi bases 2 monitor the network topology and discover the other Wi-Fi bases 2. Then the auto-configuration procedure is executed on the Wi-Fi bases 2 to allow for the proper configuration of each Wi-Fi base 2. As a result the auto-configuration procedure the network topology is partitioned and 3 different zones (i.e., groups) of devices (computing devices 8, Wi-Fi bases 2, and Wi-Fi devices 4) are created; the devices in each zone select a different Wi-Fi operational channel. In this illustrative scenario, channels 1, 6 and 11 are selected as they do not interfere with each other, where the devices in group 20 utilize channel 1, the devices in group 22 use channel 6, and the devices in group 24 use channel 11. As a result the operational performance of the devices is improved by reducing interference.

In the previous example, the operational Wi-Fi channel was selected by the Wi-Fi devices to reduce interference. Another possibility of the auto-configuration functionality can involve the reduction of the transmit (Tx) power level, thus allowing to create smaller zones (or cells), thus helping to further reduce interference. The previous illustrative scenario can be extrapolated to a dual band 2.4/5 GHz scenario, where devices create additional zones using channels in the 2.4 GHz and 5 GHz band.

Figure 3:
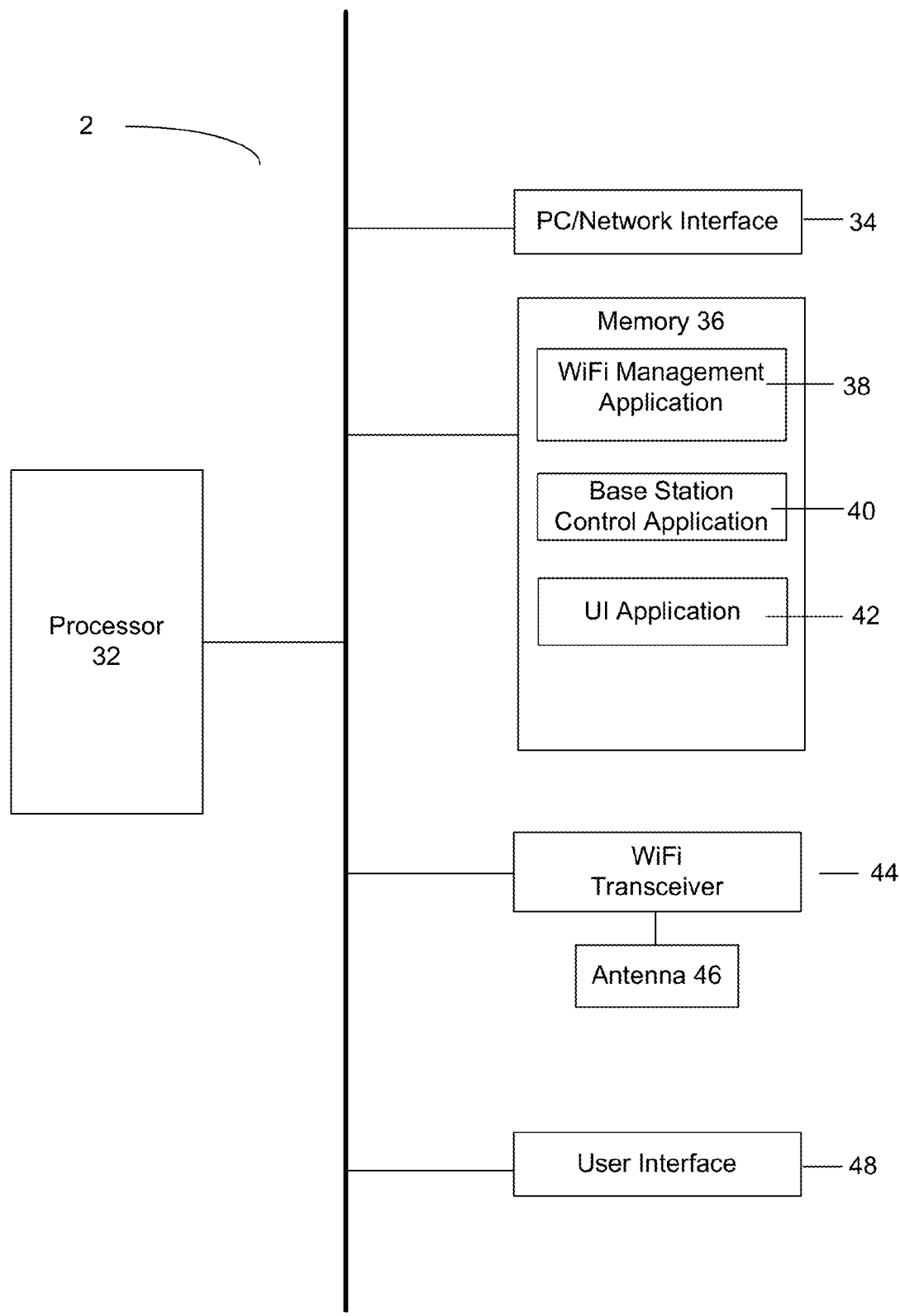
FIG. 3 illustrates a simplified block diagram of the Wi-Fi base shown in FIG. 1.

FIG. 3 illustrates a block diagram of the Wi-Fi base 2 with a Wi-Fi management application program 38. Wi-Fi base 2 includes a processor 32 operably coupled to a computer readable memory 36, a Wi-Fi transceiver 44 and accompanying antenna 46, a PC/network interface 34, and a user interface 48.

PC/network interface(s) 34 may include a personal computer interface and/or network interface. For example, the network interface may be an interface to a public switched telephone network, integrated services digital network, local area network, or wireless local area network. In one example, the PC interface is a USB interface.

Processor 32 allows for processing data, in particular managing Wi-Fi data between Wi-Fi transceiver 44 and memory 36 for managing Wi-Fi operation of Wi-Fi base 2. Processor 32 may include a variety of processors (e.g., digital signal processors), with conventional CPUs being applicable.

Computer readable memory 36 may include a variety of memories, and in one example includes SDRAM, ROM, flash memory, or a combination thereof. Computer readable memory 36 may further include separate memory structures or a single integrated memory structure. In one example, computer readable memory 36 may be used to store passwords, network and telecommunications programs, and/or an operating system (OS).

Computer readable memory 36 stores a Wi-Fi management application program 38 executed by processor 32 to monitor, analyze, and control networking and application parameters associated with Wi-Fi to optimize performance as described herein. Memory 36 may store Wi-Fi data and operational parameters for use by Wi-Fi management application program 38 to manage operation of base 2. Memory 36 also includes a base station control application 40 interfacing with Wi-Fi management application program 38 and user interface application 42 to operate Wi-Fi base 2. User interface 48 allows for manual communication between the base station user and the base station, and in one example includes an audio and/or visual interface. In a further example, user interface 48 is optional.

Instructions may be provided to memory 36 from a storage device, such as a magnetic device, read-only memory, via a remote connection (e.g., over a network via PC/Network interface(s) 34) that may be either wireless or wired providing access to one or more electronically accessible media. In alternative examples, hard-wired circuitry may be used in place of or in combination with software instructions, and execution of sequences of instructions is not limited to any specific combination of hardware circuitry and software instructions.

Wi-Fi base 2 may include operating system code and specific applications code, which may be stored in non-volatile memory. For example the code may include drivers for the Wi-Fi base 2 and code for managing the drivers and a protocol stack for communicating with the PC/network interface(s) 34 and Wi-Fi transceiver 44.

In various embodiments, the techniques of FIG. 9-11 discussed below may be implemented as sequences of instructions executed by one or more electronic systems. The instructions may be stored by the Wi-Fi base 2 or the instructions may be received by the Wi-Fi base 2 (e.g., via a network connection), or similarly by computing device 8, Wi-Fi device 4, or distributed among any of these devices.

In one example operation, Wi-Fi management application program 38 operable to discover a plurality of Wi-Fi bases 2, each Wi-Fi base 2 associated with a wireless Wi-Fi device 4 in a one-to-one relationship. The Wi-Fi management application program 38 selects a Wi-Fi channel associated with a group of Wi-Fi bases. The Wi-Fi management application program 38 further evaluates the selected Wi-Fi channel utilization, and configures an operational parameter responsive to the Wi-Fi channel utilization. In one example, the operational parameter is a physical layer transmission power level, a physical layer transmission data rate, a MAC layer QoS parameter, an application layer packet payload size and packet transmission interval, or an application layer audio coding mechanism. In one example, the Wi-Fi management application program 38 determines a high channel utilization condition or a low channel utilization condition for the selected channel.

In one example, the Wi-Fi management application program 38 may receive a control message including a start voice session message, a remote configuration message, or a remote troubleshooting message. The Wi-Fi management application program 38 gathers performance metrics responsive to the remote troubleshooting message. The performance metrics may include a packet loss rate, a packet retransmission rate, a packet delay, or a packet jitter. The Wi-Fi management application program 38 modifies operational parameters responsive to determining a low audio quality with a wireless Wi-Fi device 4, the operational parameter modified to improve the low audio quality.

In further examples, a Wi-Fi management application program 38 can reside on either or both the Wi-Fi device 4 and the Wi-Fi base 2. Regardless of where the Wi-Fi management application program 38 resides, the results of any performed function may be sent to the other device.

In one example, Wi-Fi base 2 is operable as an access point (AP), which is coupled with a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (Wi-Fi), and/or voice over internet protocol (VoIP). In one example, the access point includes a transceiver and a processor configured to allow a wireless device (e.g., a headset) access to a network connected to the access point (e.g., via an Ethernet RJ-45 port). The AP may be any device that allows wireless-equipped computers and other devices to communicate with a wired network. The AP is able to support Wi-Fi or Wi-Fi Direct. In other examples, the AP may also be able to support additional other wireless networking standards.

Figure 4:
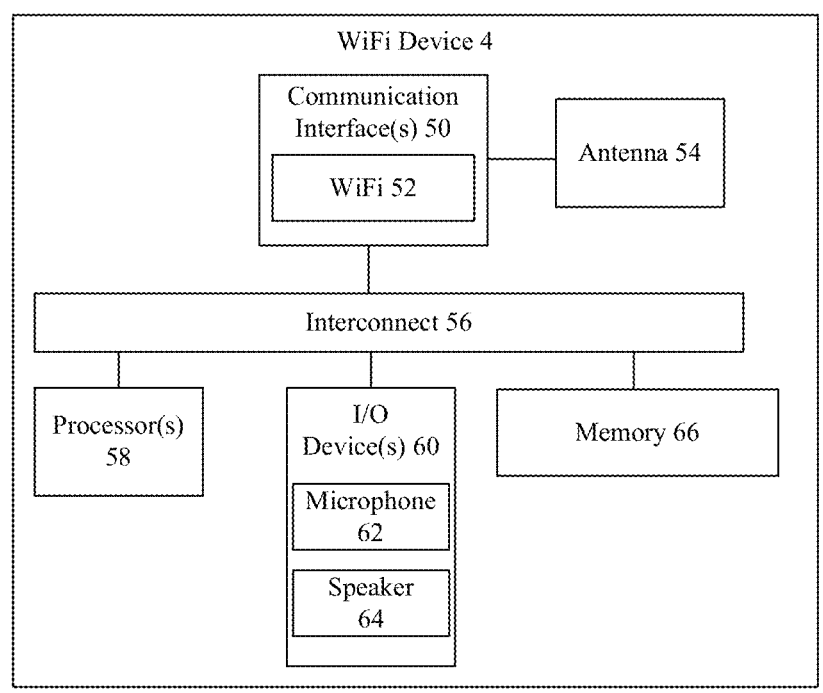
FIG. 4 illustrates a simplified block diagram of the Wi-Fi device shown in FIG. 1.

FIG. 4 illustrates a simplified block diagram of the Wi-Fi device 4 shown in FIG. 1. A simplified block diagram of the Wi-Fi device 4 is shown. In one example, the Wi-Fi device 4 includes a two-way RF communication device having data communication capabilities. The Wi-Fi device 4 may have the capability to communicate with other computer systems via a local or wide area network.

Wi-Fi device 4 includes input/output (I/O) device(s) 60 configured to interface with the user, including a microphone 62 operable to receive a user voice input or other audio. I/O device(s) 60 may also include additional input devices, such as a keyboard, touchscreen, etc., and one or more output devices, such as a display, speaker 64, etc. In some embodiments, I/O device(s) 60 may include one or more of a display device, such as a liquid crystal display (LCD), an alphanumeric input device, such as a keyboard, and/or a cursor control device, and a biometric input device. I/O device(s) 60 include a user interface operable to receive a user request to enter a device pairing mode.

The Wi-Fi device 4 includes a processor 58 configured to execute code stored in a memory 66. While only a single processor 58 is shown, Wi-Fi device 4 may include multiple processors and/or co-processors, or one or more processors having multiple cores. The processor 58 and memory 66 may be provided on a single application-specific integrated circuit, or the processor 58 and the memory 66 may be provided in separate integrated circuits or other circuits configured to provide functionality for executing program instructions and storing program instructions and other data, respectively. Memory 66 may include both volatile and non-volatile memory such as random access memory (RAM) and read-only memory (ROM). Memory 66 also may be used to store temporary variables or other intermediate information during execution of instructions by processor 58. For example, memory 66 may include Wi-Fi data and Wi-Fi operational parameters.

Wi-Fi device 4 includes communication interface(s) 50, one or more of which may utilize an antenna 54. The communications interface(s) 50 may also include other processing means, such as a digital signal processor and local oscillators. In one example, communications interface(s) 50 include one or more short-range wireless communications subsystems which provide communication between Wi-Fi device 4 and different systems or devices. The short-range communications subsystem includes a Wi-Fi subsystem 52.

In further example, the short range communications system may also include an infrared device and associated circuit components for short-range communication, a near field communications (NFC) subsystem, or a Bluetooth subsystem including a transceiver. Interconnect 56 may communicate information between the various components of Wi-Fi device 4.

Instructions may be provided to memory 66 from a storage device, such as a magnetic device, read-only memory, via a remote connection (e.g., over a network via communication interface(s) 50) that may be either wireless or wired providing access to one or more electronically accessible media. In alternative examples, hard-wired circuitry may be used in place of or in combination with software instructions, and execution of sequences of instructions is not limited to any specific combination of hardware circuitry and software instructions.

Wi-Fi device 4 may include operating system code and specific applications code, which may be stored in non-volatile memory. For example the code may include drivers for the Wi-Fi device 4 and code for managing the drivers and a protocol stack for communicating with the communications interface(s) 50 which may include a receiver and a transmitter and is connected to an antenna 54. Communication interface(s) 50 provides a wireless interface for communication with Wi-Fi device 4.

Communication interface(s) 50 may provide access to a network, such as a local area network. Communication interface(s) 50 may include, for example, a wireless network interface having antenna 54, which may represent one or more antenna(e). Communication interface(s) 50 may provide access to a local area network and/or a personal area network, for example, by conforming to Bluetooth standards. In addition, communication via wireless LAN standards, communication interface(s) 50 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In various examples, Wi-Fi device 4 represents a range of electronic devices, for example, headsets, computer systems, tablet computers, smartphones, laptops, PDAs, cellular telephones, etc. In certain cases, such as where Wi-Fi device 4 is a wireless headset, the device may have a limited user interface (e.g., no display or reduced user input buttons). The specific design and implementation of the communications interfaces of the Wi-Fi device 4 is dependent upon the communication networks in which the devices are intended to operate.

Figure 5:
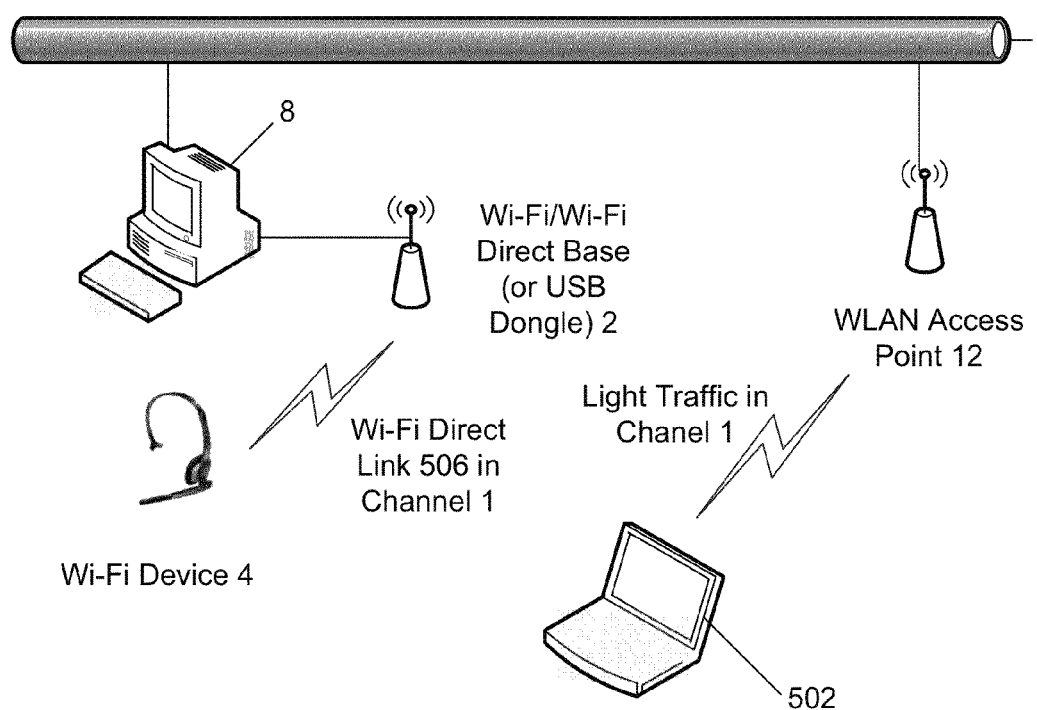
FIG. 5 illustrates a usage scenario of the system shown in FIG. 1 in one example.
Figure 6:
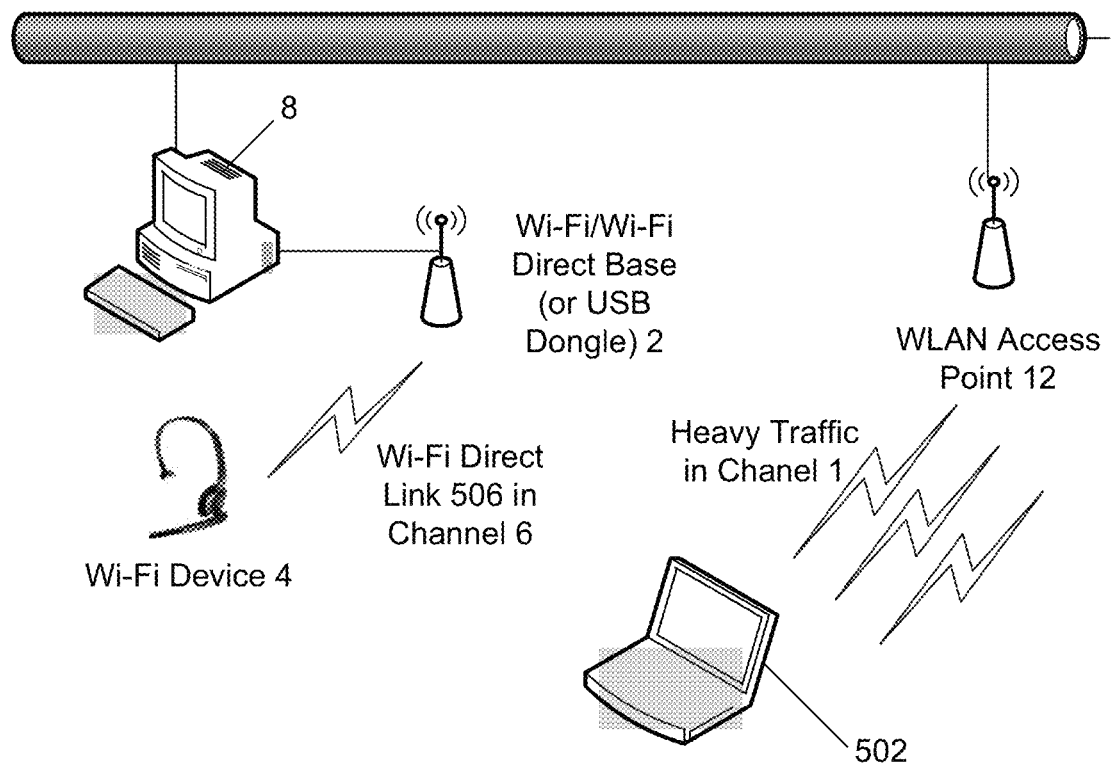
FIG. 6 illustrates a usage scenario of the system shown in FIG. 1 in a further example.

FIG. 5 and FIG. 6 illustrate self-healing usage scenarios of the system shown in FIG. 1 in one example. A network topology is deployed as illustrated in FIG. 5. Initially a Wi-Fi direct peer-to-peer link 506 between the Wi-Fi base 2 and Wi-Fi device 4 is good and suffers interference from low traffic load in an example selected operational Wi-Fi channel 1. Eventually traffic load may increase in the selected channel from devices 502 as illustrated in FIG. 6, thus affecting the performance of the Wi-Fi direct peer-to-peer link 506 between the Wi-Fi base 2 and the Wi-Fi device 4. A self-healing function is executed in the Wi-Fi base 2, and a different operational channel (e.g., channel 6) is selected for the Wi-Fi direct peer-to-peer link 506, as illustrated in FIG. 6.

Figure 7:
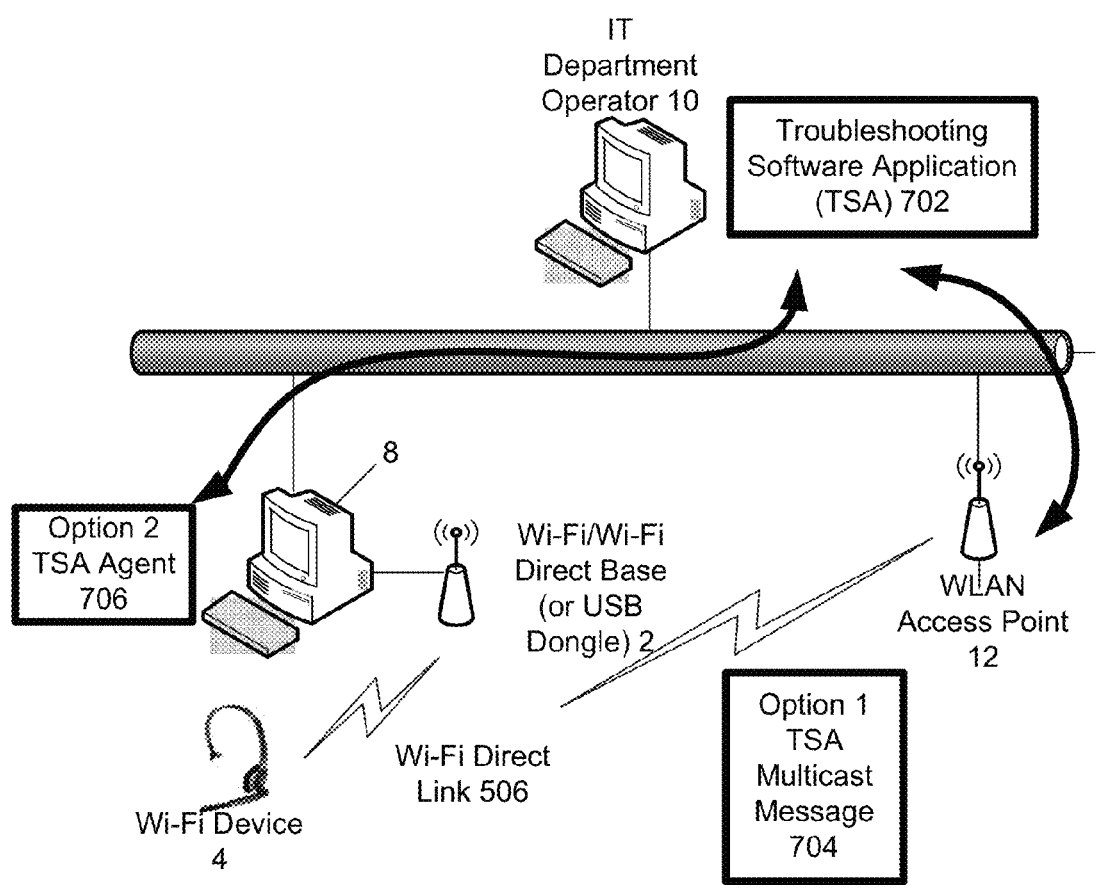
FIG. 7 illustrates operation of a troubleshooting application in a Wi-Fi network in one example.

FIG. 7 illustrates operation of a troubleshooting application in a Wi-Fi network in one example. The Wi-Fi device 4 and Wi-Fi base 2 implement firmware functionalities to support remote troubleshooting functions. The devices can be remotely accessed to download operational status reports to troubleshoot connectivity problems.

The remote troubleshooting functionality is achieved using a Troubleshooting Software Application (TSA) 702. The TSA application 702 uses a multicast channel to send requests to specific Wi-Fi bases 2 or Wi-Fi devices 4 to download important operational status information. Alternatively TSA agents 706 may be deployed in the computing devices 8 (e.g., PCs), Wi-Fi bases 2, and/or Wi-Fi devices 4 which can interact with the TSA application 702. Both approaches (i.e. multicast, and TSA agents) are illustrated in FIG. 7.

The reports downloaded from the Wi-Fi bases 2 and Wi-Fi devices 4 include (1) physical Layer Wi-Fi configuration parameters, (2) MAC layer Wi-Fi configuration parameters, and (3) operational status information, such as, packet error rate, packet retransmissions, packet delay, data throughput, number of neighboring Wi-Fi devices operating in the same channel, and Wi-Fi channel utilization.

Figure 8:
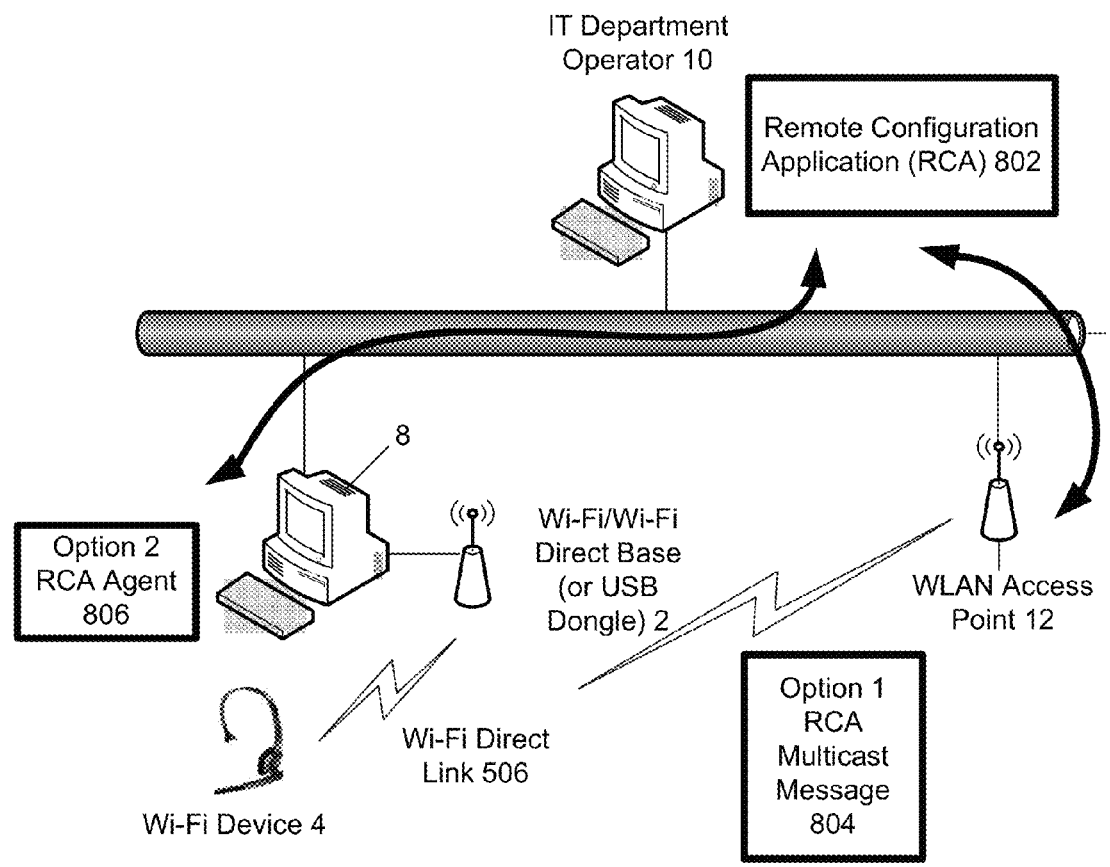
FIG. 8 illustrates operation of a remote configuration application in a Wi-Fi network in one example.

FIG. 8 illustrates operation of a remote configuration application in a Wi-Fi network in one example. The Wi-Fi device 4 and Wi-Fi base 2 implement firmware functionalities to support remote configuration functions. This functionality is particularly advantageous in enterprise environments where a large number of Wi-Fi bases 2 and Wi-Fi devices 4 are deployed.

The remote configuration functionality makes us of a Remote Configuration Application (RCA) 802 which is used to transmit configuration profiles to Wi-Fi bases 2 and Wi-Fi devices 4. The transmission of these configuration profiles may be done using multicast messages 804 transmitted over the Wi-Fi infrastructure network (i.e. using Wi-Fi access points). Alternatively, the computing devices 8, Wi-Fi bases 2 and Wi-Fi devices 4 can implement an RCA agent 806 which can interact with the centralized RCA application 802.

Figure 9:
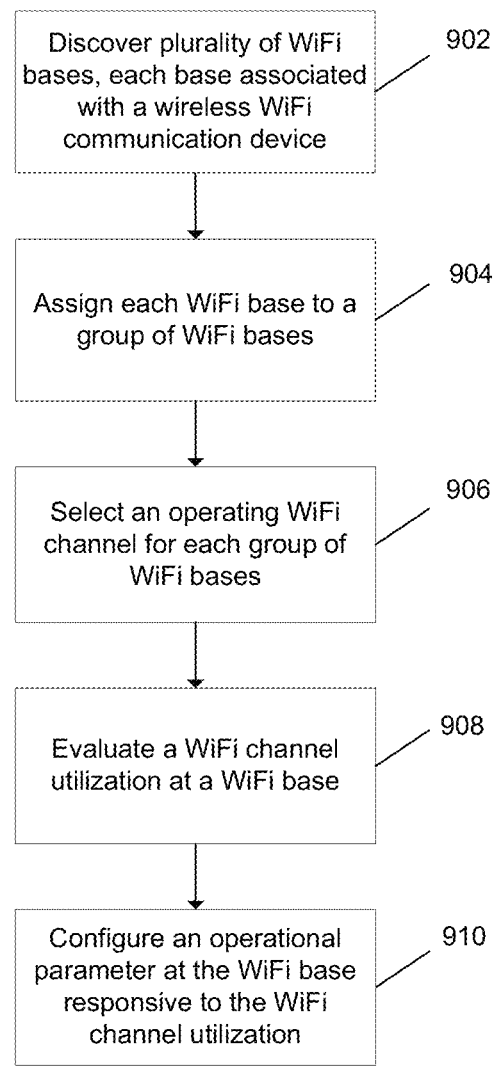
FIG. 9 is a flow diagram illustrating a process for operating a network of Wi-Fi bases in one example.

FIG. 9 is a flow diagram illustrating a process for operating a network of Wi-Fi bases in one example. At block 902, a plurality of Wi-Fi bases are discovered, each Wi-Fi base associated with a wireless Wi-Fi device in a one-to-one relationship. In one example, each Wi-Fi base of the plurality of Wi-Fi bases is a USB device coupled to a USB port of a computing device.

At block 904, each Wi-Fi base is assigned to a group of Wi-Fi bases, the plurality of Wi-Fi bases divided into two or more groups. At block 906, an operating Wi-Fi channel is selected for each group of the two or more groups. In one example, selecting an operating Wi-Fi channel for each group of the two or more groups includes selecting a non-overlapping channel for a neighboring group.

At block 908, a Wi-Fi channel utilization is evaluated at a Wi-Fi base. In one example, evaluating the Wi-Fi channel utilization at a Wi-Fi base includes determining a high channel utilization condition or a low channel utilization condition.

At block 910, an operational parameter is configured at the Wi-Fi base responsive to the Wi-Fi channel utilization. In one example, the operational parameter includes a physical layer transmission power level, a physical layer transmission data rate, a MAC layer QoS parameter, an application layer packet payload size and packet transmission interval, or an application layer audio coding mechanism.

In one example, the process further includes linking (i.e., connecting) a Wi-Fi base with the wireless Wi-Fi device. In one example, the process further includes receiving a control message at a Wi-Fi base including a start voice session message, a remote configuration message, or a remote troubleshooting message. The process includes gathering performance metrics at the Wi-Fi base responsive to the remote troubleshooting message. The performance metrics include a packet loss rate, a packet retransmission rate, a packet delay, or a packet jitter.

In one example, the process further includes modifying an operational parameter at the Wi-Fi base responsive to determining a low audio quality between the Wi-Fi base and the wireless Wi-Fi device, the operational parameter modified to improve the low audio quality. For example, the modified operational parameter may be a physical layer transmission power level, a physical layer transmission data rate, a MAC layer QoS parameter, an application layer packet payload size and packet transmission interval, or an application layer audio coding mechanism.

Figure 10:
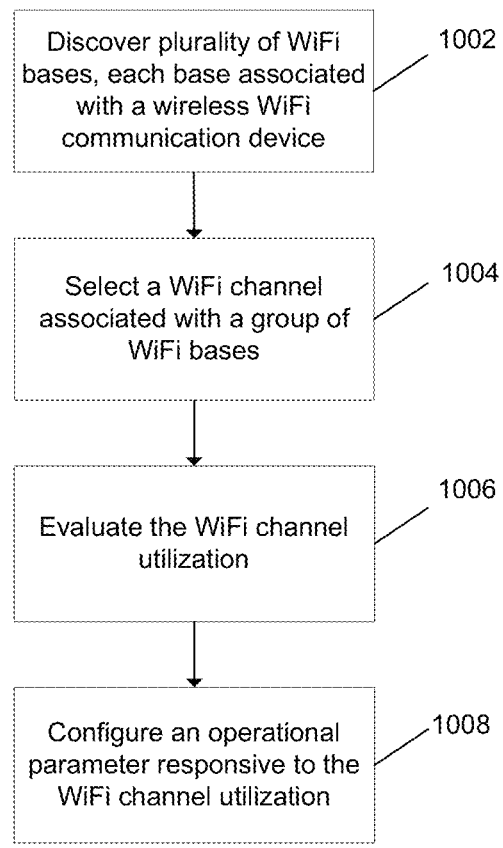
FIG. 10 is a flow diagram illustrating a process for operating a network of Wi-Fi bases in a further example.

FIG. 10 is a flow diagram illustrating a process for operating a network of Wi-Fi bases in a further example. At block 1002, a plurality of Wi-Fi bases are discovered, each Wi-Fi base associated with a wireless Wi-Fi device in a one-to-one relationship. At block 1004, a Wi-Fi channel is selected associated with a group of Wi-Fi bases, where the group of Wi-Fi bases is a subset of the plurality of Wi-Fi bases.

At block 1006, the Wi-Fi channel utilization is evaluated. At block 1008, an operational parameter is configured responsive to the Wi-Fi channel utilization. In one example, the operational parameter configured is a physical layer transmission power level, a physical layer transmission data rate, a MAC layer QoS parameter, an application layer packet payload size and packet transmission interval, or an application layer audio coding mechanism. In one example, the process further includes modifying an operational parameter responsive to determining a low audio quality with a wireless Wi-Fi device, the operational parameter modified to improve the low audio quality.

Figure 11A:
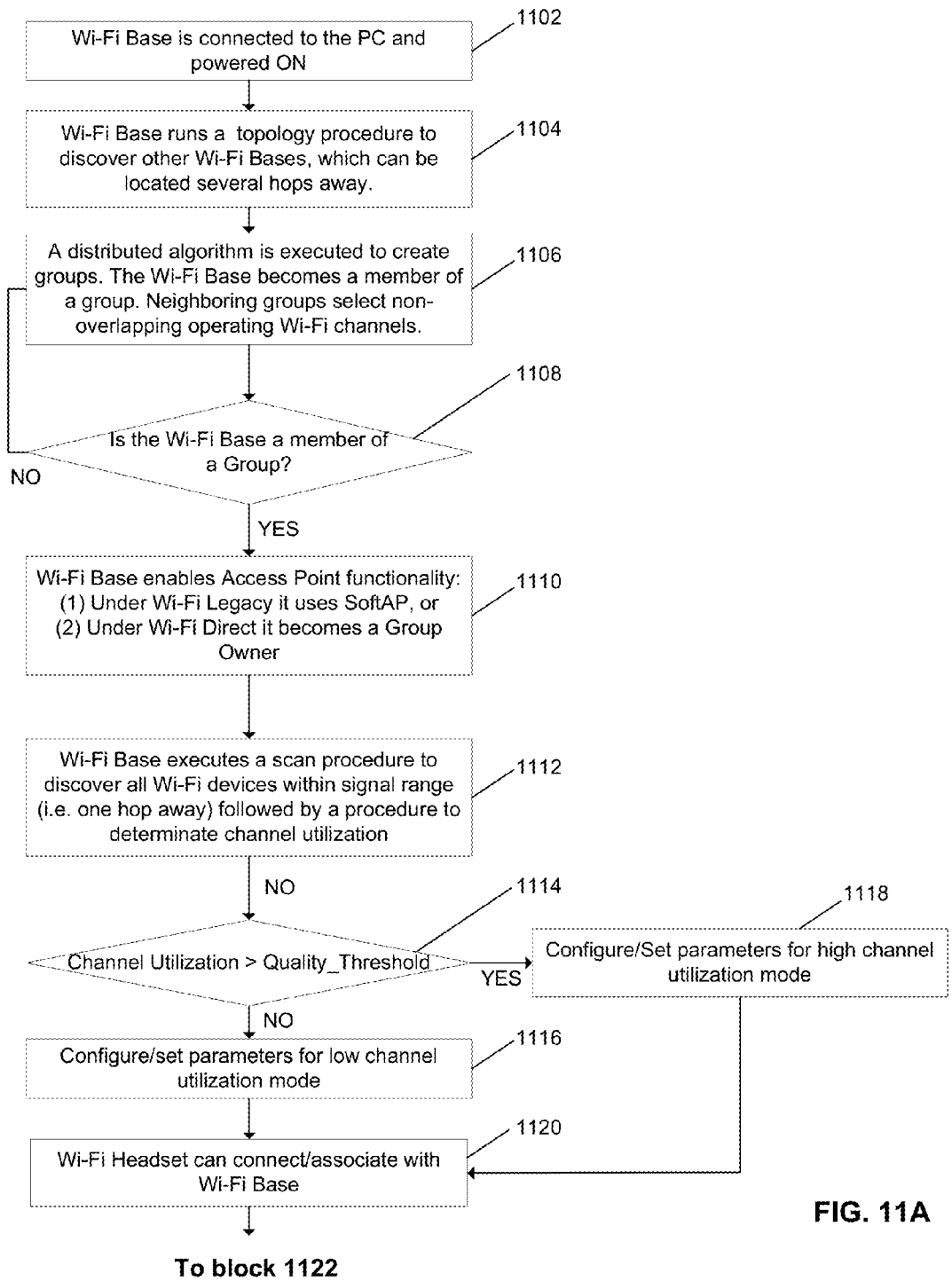
FIGS. 11A and 11B are a flow diagram illustrating a process for operating a network of Wi-Fi bases in a further example.
Figure 11B:
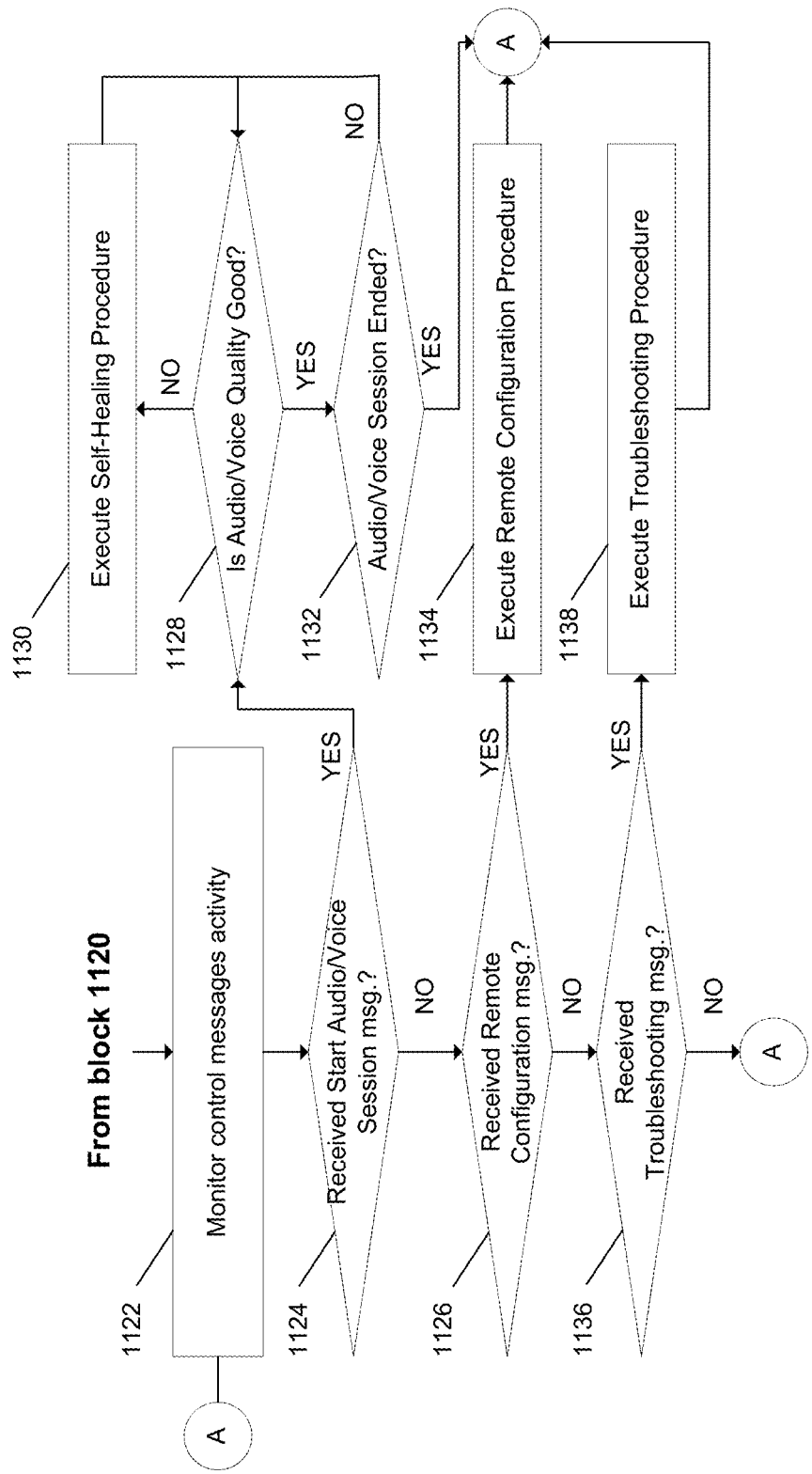

FIGS. 11A and 11B are a flow diagram illustrating a process for operating a network of Wi-Fi bases in a further example. At block 1102, a Wi-Fi base (WFB) is connected to a Personal Computer (PC) and receives power from the PC. The WFB runs any required initialization routines and is now ready to execute the next process.

At block 1104, the WFB needs to discover other WFBs in the network and the network topology as well. To achieve this goal the WFB will run a topology discovery procedure; the resulting information will include (1) the number of WFBs in the premise, and (2) the number of WFBs located at a one-hop, at two-hops, at three-hops, etc. A hop is the number wireless transmissions it takes for a packet to reach its intended destination. For example, the number of WFBs located at a one-hop means all the Wi-Fi Bases which are within radio signal coverage of a specific Wi-Fi Base. In other words, a Wi-Fi Base is capable of directly transmitting packets to one-hop Wi-Fi Bases because they are within radio signal coverage. Similarly, Wi-Fi Bases located at two-hops include all the WFBs which are within the radio signal coverage of a one-hop Wi-Fi Base.

At block 1106, based on the information derived in block 1104, the next step is to execute an analytical or heuristic algorithm to determine the number of groups that will be used in the network topology. The main goal of this process is to come up with an optimum selection of groups where each group will be composed of Wi-Fi bases (WFBs) and Wi-Fi headsets (WFHs) operating in a specific Wi-Fi Channel. In addition, neighboring groups will select non-overlapping Wi-Fi channels to reduce radio signal interference between the devices operating in each group. The selection of non-overlapping channels may be either by selecting different channels in the same frequency band, or by selecting channels in different frequency bands. For example, in the 2.4 GHz frequency band, channels 1 (2.412 GHz), 6 (2.437 GHz) and 11 (2.462 GHz) are non-overlapping.

At decision block 1108, if the WFB is not a member of a group, then block 1106 continues to be executed. If the WFB is a member of a group then block 1110 is executed. As a result, block 1106 is executed until the WFB has selected a group and an operational Wi-Fi channel has been defined.

At block 1110, in this process, the WFB is ready to pair with the WFH. To achieve this goal two approaches may be selected: (1) Legacy Wi-Fi Mode: In the Legacy Wi-Fi Mode, the WFB will enable a software Access Point functionality (SoftAP) to allow the WFH to connect and associate with the WFB, or (2) Wi-Fi Direct Mode: In the Wi-Fi Direct Mode, the WFB will enable the Group Owner (GO) functionality to allow the WFH (i.e. Wi-Fi Direct Client) to connect and associate with the WFB.

At block 1112, in this process the WFB will evaluate the Channel Utilization (CU) by scanning for other devices operating in the selected Wi-Fi channel. The CU is a function of the traffic load resulting from communications from any other Wi-Fi device (i.e. other WFB, smartphones, laptop, etc.) operating in the same Wi-Fi channel. The CU is dynamic and the resulting statistic changes over time. As a result, the CU metric may be periodically monitored to provide an updated measure of the traffic load in the selected Wi-Fi channel. The CU metric is a parameter that is used in other stages, such as in the decision block 1128 stage where Audio/Voice Quality is evaluated.

At decision block 1114, the Channel Utilization metric is compared against a Quality_Threshold (QT) value. Values above the QT indicate a high CU condition, and values below the QT indicate a low CU condition. If a high CU condition is observed then block 1118 is executed, else if a low CU condition is observed then block 1116 is executed.

At block 1116, if the CU metric does not exceed the QT, then the WFB is operating in a low CU environment and the operation parameters for communications between the WFB and the WFH are setup accordingly.

At block 1118, if the CU metric exceeds the QT, then the WFB is operating in a high CU environment and the operation parameters for communications between the WFB and the WFH are setup accordingly.

For blocks 1116 and 1118, the operational parameters include:
  Physical layer transmission power level.
  Physical layer transmission data rate.
  MAC layer QoS parameters
  Application layer packet payload size and packet transmission interval.
  Application layer audio coding mechanism One example of a parameter adjustment/setup can be associated with the transmission power level of the Wi-Fi radio transceiver. For example, in high CU environments the Tx power level can be lowered to reduce the radio signal interference with neighboring device. In low CU environments, the Tx power level can be increased to provide a better radio signal coverage to the user.

Another example of a parameter adjustment can be associated with the size and periodicity at which audio packets are being sent over the wireless medium. For example, in high CU environments it can be preferable to transmit larger packets less often, thus reducing wireless channel access contention. In contrast, in low CU environments smaller packets can be transmitted more often over the wireless link.

Another example of a parameter adjustment can be associated with the audio coding mechanism at the application layer. For example, in high CU environments the audio sampling rate can be reduced to 8000 samples per second (low-quality audio). In contrast, in low CU environments a higher audio sampling rate can be used to provide a higher audio quality to the user.

At block 1120, once the operational parameters have been properly defined, the WFH may connect and associate with the WFB. The selected operational parameters will be reported to the WFH by the WFB to enable proper operation between the WFB and the WFH.

At block 1122, in this process, the WFB is idle and monitoring for the arrival of any control messages which will trigger different operating functions. These control messages can be generated by the Personal Computer and reported to the WFB. Alternatively the control messages may be generated by a remote application and reported to the WFB over the wireless channel using a defined multicast message which is transmitted over the Wi-Fi infrastructure network.

At decision block 1124, the Personal Computer may request to the WFB to start an audio/voice session; this is reported using a Start Audio/Voice Session (SAVS) message. If the WFB receives the SAVS message then an audio/voice session is initiated between the WFB and the WFH and decision block 1128 is evaluated.

At decision block 1126, a Remote Configuration Message (RCM) may be received by the WFB. This message is used to configure operational parameters for the WFB and the WFH. If the RCM is received then block 1134 is executed.

The RCM is generated by a Remote Configuration Application (RCA) which can reside on any computer with access to the corporative network infrastructure. Ideally the RCA may be controlled by the Information Technology (IT) department.

The RCA can transmit an RCM to a specific WFB using a unicast message sent directly to the personal computer where the WFB is connected. In this case, the WFB software application running locally in the PC will receive the RCM and forward it to the WFB.

Alternatively, the RCA can transmit the RCM to the WFB using a multicast message which is transmitted over the Wi-Fi infrastructure network. In this scenario WFBs are members of a multicast group which is used to transmit control messages to setup and configure the WFB using a Remote Configuration Application.

At decision block 1136, if the WFB receives a Troubleshooting message (TM) then block 1138 is executed.

The TM is generated by a Troubleshooting Software Application (TSA) which can reside on any computer with access to the corporative network infrastructure. Ideally the TSA may be controlled by the Information Technology (IT) department.

The TSA can transmit a TM to a specific WFB using a unicast message sent directly to the personal computer where the WFB is connected. In this case, the WFB software application running locally in the PC will receive the TM and forward it to the WFB.

Alternatively, the TSA can transmit the TM to the WFB using a multicast message which is transmitted over the Wi-Fi infrastructure network. In this scenario WFBs are members of a multicast group which is used to transmit control messages to troubleshoot the WFB using a Troubleshoot Software Application.

At decision block 1128, once an audio/voice session has been started between the WFB and the WFH. The WFB evaluates the audio/voice quality. If the audio/voice quality statistic is acceptable then decision block 1132 is evaluated. If the audio/voice quality is not acceptable then the WFB will trigger a Self-Healing procedure and block 1130 is executed.

At decision block 1132, if the audio/voice session has ended then block 1122 is executed. If the audio/voice session has not ended then decision block 1128 continues to be evaluated.

At block 1130, if the audio/voice quality is considered not acceptable, then the WFB will execute a Self-Healing procedure which is used to modify the operational parameters to provide a better quality to the user. To achieve this goal an analytical or heuristic algorithm is used to determinate the best parameters configuration to improve audio/voice signal quality. The operational parameters include:
Physical layer operational Wi-Fi channel.
Physical layer transmission power level.
Physical layer transmission data rate.
MAC layer QoS parameters
Routing layer roaming support
Application layer packet payload size and packet transmission interval.
Application layer audio coding mechanism Upon execution of the Self-Healing procedure, the WFB will verify the audio/voice signal quality by evaluating decision block 1128.

At block 1134, in this process the Remote Configuration Procedure is executed. Based on the information provided by the Remote Configuration Message (RCM) the WFB will modify the operation parameters, which include:
Physical layer operational Wi-Fi channel.
Physical layer transmission power level.
Physical layer transmission data rate.
MAC layer QoS parameters
Routing layer roaming support
Application layer packet payload size and packet transmission interval.
Application layer audio coding mechanism Upon execution of the Remote Configuration Procedure, the WFB will proceed to execute block 1122.

At block 1138, the Troubleshooting process is executed as a result of a received TM by the WFB. In this procedure the WFB collects all the information related to (a) configuration parameters, as well as, (b) performance metrics. The collected information is then reported back to the TSA. The information to be reported includes:

(c) Configuration Parameters
Physical layer operational Wi-Fi channel.
Physical layer transmission power level.
Physical layer transmission data rate.
MAC layer QoS parameters
Routing layer roaming support
Application layer packet payload size and packet transmission interval.
Application layer audio coding mechanism
(d) Performance metrics
Packet loss rate
Packet retransmission rate
Packet delay
Packet jitter Upon execution of the Remote Configuration Procedure, the WFB will proceed to execute block 1122.

While the exemplary embodiments of the present invention are described and illustrated herein, it will be appreciated that they are merely illustrative and that modifications can be made to these embodiments without departing from the spirit and scope of the invention. For example, methods, techniques, and apparatuses described as applying to one embodiment or example may also be utilized with other embodiments or examples described herein. Thus, the scope of the invention is intended to be defined only in terms of the following claims as may be amended, with each claim being expressly incorporated into this Description of Specific Embodiments as an embodiment of the invention.

What is claimed is:

1. A method for operating a network of Wi-Fi bases comprising:
discovering a plurality of Wi-Fi bases, each Wi-Fi base associated with a wireless Wi-Fi device in a one-to-one relationship;
assigning each Wi-Fi base to a group of Wi-Fi bases, the plurality of Wi-Fi bases divided into two or more groups;
selecting an operating Wi-Fi channel for each group of the two or more groups;
evaluating a Wi-Fi channel utilization at a Wi-Fi base; and
configuring an operational parameter at the Wi-Fi base responsive to the Wi-Fi channel utilization.

2. The method of claim 1, wherein each Wi-Fi base of the plurality of Wi-Fi bases is a USB device coupled to a USB port of a computing device.

3. The method of claim 1, wherein the wireless Wi-Fi device is a telecommunications headset.

4. The method of claim 1, wherein selecting an operating Wi-Fi channel for each group of the two or more groups comprises selecting a non-overlapping channel for a neighboring group.

5. The method of claim 1, further comprising linking a Wi-Fi base with the wireless Wi-Fi device.

6. The method of claim 1, wherein evaluating a Wi-Fi channel utilization at a Wi-Fi base comprises determining a high channel utilization condition or a low channel utilization condition.

7. The method of claim 1, wherein the operational parameter comprises a physical layer transmission power level, a physical layer transmission data rate, a MAC layer QoS parameter, an application layer packet payload size and packet transmission interval, or an application layer audio coding mechanism.

8. The method of claim 1, further comprising receiving a control message at a Wi-Fi base comprising a start voice session message, a remote configuration message, or a remote troubleshooting message.

9. The method of claim 8, further comprising gathering performance metrics at the Wi-Fi base responsive to the remote troubleshooting message, the performance metrics comprising a packet loss rate, a packet retransmission rate, a packet delay, or a packet jitter.

10. The method of claim 1, further comprising modifying an operational parameter at the Wi-Fi base responsive to determining a low audio quality between the Wi-Fi base and the wireless Wi-Fi device, the operational parameter modified to improve the low audio quality.

11. The method of claim 10, wherein the operational parameter comprises a physical layer transmission power level, a physical layer transmission data rate, a MAC layer QoS parameter, an application layer packet payload size and packet transmission interval, or an application layer audio coding mechanism.

12. A non-transitory computer readable storage memory storing instructions that when executed by a computer cause the computer to perform a method for Wi-Fi base operation comprising:
 discovering a plurality of Wi-Fi bases, each Wi-Fi base associated with a wireless Wi-Fi device in a one-to-one relationship;
 selecting a Wi-Fi channel associated with a group of Wi-Fi bases, wherein the group of Wi-Fi bases is a subset of the plurality of Wi-Fi bases;
 evaluating a Wi-Fi channel utilization for the W-Fi channel; and
 configuring an operational parameter responsive to the Wi-Fi channel utilization.

13. The non-transitory computer readable storage memory of claim 12, wherein the operational parameter comprises a physical layer transmission power level, a physical layer transmission data rate, a MAC layer QoS parameter, an application layer packet payload size and packet transmission interval, or an application layer audio coding mechanism.

14. The non-transitory computer readable storage memory of claim 12, the method further comprising connecting to an associated wireless Wi-Fi device.

15. The non-transitory computer readable storage memory of claim 14, wherein the associated wireless Wi-Fi device is a telecommunications headset.

16. The non-transitory computer readable storage memory of claim 12, wherein evaluating a Wi-Fi channel utilization comprises determining a high channel utilization condition or a low channel utilization condition.

17. The non-transitory computer readable storage memory of claim 12, the method further comprising receiving a control message comprising a start voice session message, a remote configuration message, or a remote troubleshooting message.

18. The non-transitory computer readable storage memory of claim 17, the method further comprising gathering performance metrics responsive to the remote troubleshooting message, the performance metrics comprising a packet loss rate, a packet retransmission rate, a packet delay, or a packet jitter.

19. The non-transitory computer readable storage memory of claim 12, the method further comprising modifying an operational parameter responsive to determining a low audio quality with a wireless Wi-Fi device, the operational parameter modified to improve the low audio quality.

* * * * *